United States Patent
Lampel

(10) Patent No.: US 6,625,830 B2
(45) Date of Patent: Sep. 30, 2003

(54) WHEELCHAIR CUSHION

(76) Inventor: Neal Lampel, 15108 Ashland Dr., F222, Delray Beach, FL (US) 33484

( * ) Notice: Subject to any disclaimer, the term of this patent is extended or adjusted under 35 U.S.C. 154(b) by 1 day.

(21) Appl. No.: 09/970,053

(22) Filed: Oct. 2, 2001

(65) Prior Publication Data

US 2003/0061663 A1 Apr. 3, 2003

(51) Int. Cl.$^7$ .................. A47C 27/18; A47C 27/14; A61G 7/057
(52) U.S. Cl. .................. 5/653; 5/654; 5/655.5; 5/655.9; 5/909; 297/452.26; 297/452.27; 297/DIG. 1
(58) Field of Search .................. 5/653, 654, 655.9, 5/655.5, 909; 297/452.26, 452.27, DIG. 1

(56) References Cited

U.S. PATENT DOCUMENTS

| | | | |
|---|---|---|---|
| 5,018,790 A | * 5/1991 | Jay | 5/653 |
| 5,039,567 A | 8/1991 | Landi et al. | 428/116 |
| 5,180,619 A | 1/1993 | Landi et al. | 428/116 |
| 5,189,747 A | * 3/1993 | Mundy et al. | 5/654 |
| 5,203,607 A | 4/1993 | Landi | 297/214 |
| 5,444,881 A | 8/1995 | Landi et al. | 5/454 |
| 5,617,595 A | 4/1997 | Landi et al. | 5/653 |
| 5,737,788 A | * 4/1998 | Castellino et al. | 5/655.5 |
| 5,749,111 A | * 5/1998 | Pearce | 5/653 |
| 5,840,400 A | 11/1998 | Landi et al. | 428/116 |
| 5,855,415 A | * 1/1999 | Lilley, Jr. | 5/653 |
| 6,026,527 A | * 2/2000 | Pearce | 5/654 |

* cited by examiner

Primary Examiner—Alex Grosz
(74) Attorney, Agent, or Firm—Conley Rose, P.C.

(57) ABSTRACT

A wheelchair cushion having a solid gel patient interface, a matrix or honeycomb panel and a foam base. The gel layer is mold around and over the honeycomb panel to produce a composite panel with patient interface characteristics of a gel layer, but with reduced weight. The matrix panel cells are open on the lower ends which are bonded to a soft foam base. The matrix panel interacts with the foam base to spread forces and provide pressure reduction and positioning better than solid gel, but with less weight. The foam base may include several layers of differing density and contouring elements. The composite panel conforms to the base contours to provide a contoured patient interface.

17 Claims, 10 Drawing Sheets

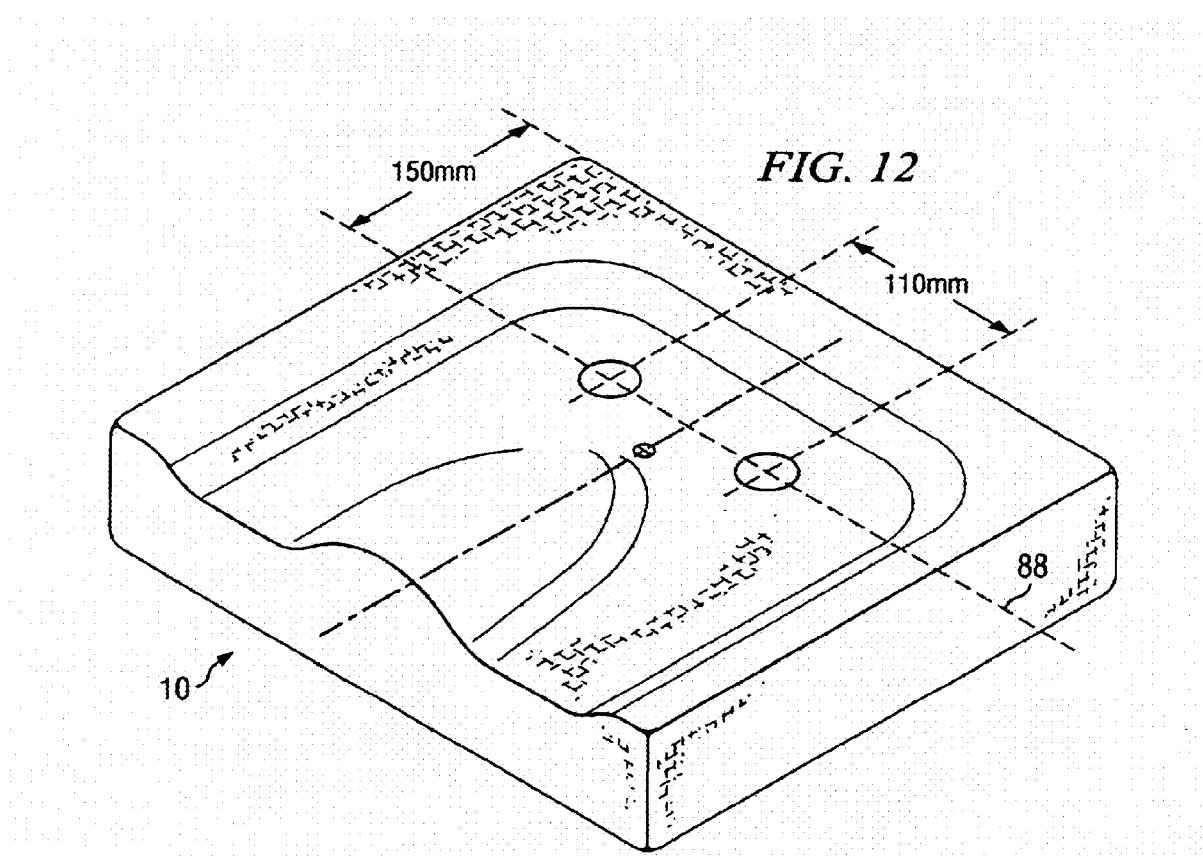
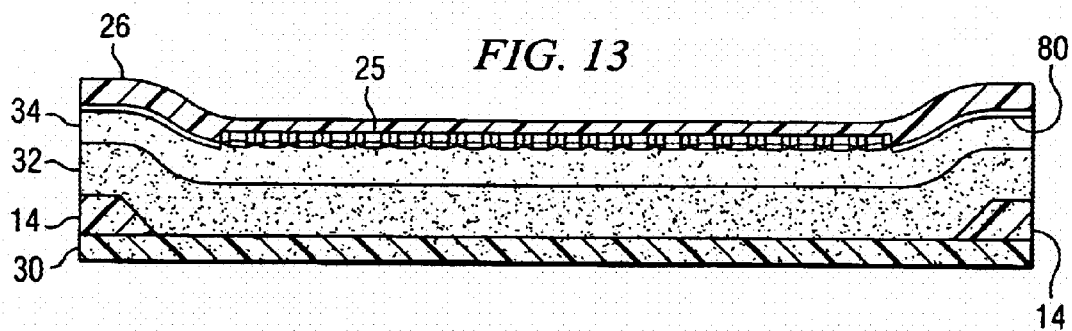

WHEELCHAIR CUSHION

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

The present invention relates to anatomical support apparatus and more particularly to a cushion having layers of gel, an open cell panel and a foam base.

Persons requiring the assistance of wheelchairs are at risk for the development of pressure sores from sitting on wheelchair seats or cushions. Pressure sore development is clinically termed decubitus ulceration. Decubitus ulceration arises primarily from prolonged exposure to unacceptably high pressure levels and the subsequent loss of adequate blood flow to the affected tissues. Secondly, decubitus ulceration results from any internal horizontal or tangential forces imparted deep within the tissue layers. This horizontal tearing within the deep tissue layers is commonly known as sheer. It primarily originates along bone-tissue interfaces, or tissue-tissue interfaces (when the tissues are sufficiently dissimilar in elasticity, density or structure). Other factors compound the likelihood of decubitus ulcer development and may additionally impede the healing process. The general healthiness, elasticity and integrity of the patient's tissue, available natural cushioning, i.e., adipose tissue (fat tissue) surrounding the affected bony protuberances of the seated posture, the average sustained surface temperature of the cushioning device, moisture due to perspiration or incontinence, maintenance requirements of the cushioning device itself, the patient's cognitive abilities when required to adhere to a regimen of weight shifting and re-positioning themselves on the cushioning device and the attentiveness of caregivers when requiring assistance with these tasks.

Premium cushioning devices are designed to prevent pressure sores and/or to promote healing of pressure sores. The first requisite of a premium cushioning device is to diminish the downward measurable pressure, especially in areas which correspond to the location of bony prominences and thereby maintain healthy circulation. This is primarily achieved through increasing the contacted area via anatomical contouring of the cushioning device. This contouring is the result of the manufactured shaping (unloaded contouring) plus the compression of the cushioning device at loaded equilibrium, i.e., the time required for the cushioning device to undergo no additional compression with respect to time.

Today, computerized pressure mapping systems are widely used in wheelchair assessment clinics. These systems measure pressure between the patient and the surface of the cushioning device and this surface of the cushioning device is commonly referred to as the "patient interface." This external reading of pressure is an index and used to approximate the actual pressures which lie across the bone-tissue interfaces deep within the body. Pressure sores generally originate deep within the tissue layers along the bony prominences and progress outward to the external epidermis. Clinicians have developed guidelines to model the required indexed pressure readings to prevent the onset of pressure sores. Clinicians have also modeled the required external pressure readings which are required to reestablish the healthy circulation necessary to heal existing pressure sores. The external pressure readings which correspond to the coccyx, the sacrum and the ischial tuberosities (the relatively sharp endings of the posterior pelvis) are the areas most heavily scrutinized during wheelchair seating assessments.

A second requisite for a premium cushioning device is to provide a stable platform to enhance pelvic stability and to improve postural alignment. With time, a patient with poor sitting posture may develop pronounced skeletal deformities. Initially these deformities are reversible and are clinically termed "flexible," such as a "flexible pelvic obliquity." In time, these compromised postures become permanent deformities through the calcification of the affected joints and may lead to additional complications, including circulatory, neurological, respiratory, and physically interfere with daily activities such as eating or transferring from a wheelchair to a bed or toilet. Ideally, for a cushioning device to address this pelvic postural requirement, termed "positioning," the cushion at loaded equilibrium must have sufficient depth in contouring (manufactured contours plus additional loaded contouring) to anatomically resemble the human sitting regions, which include the underside of the upper and lower thighs. Additional stability is made possible if the pressure relieving media retain a uniform thickness at loaded equilibrium, that is, if they are highly viscous or semi-solid.

Many pressure reduction and positioning cushioning devices have been made available. The less effective and simpler devices are primarily designed to afford some degree of pressure reduction with some level of enhanced comfort. These devices are generally comprised of a single density polyurethane foam encased within a cover and are without any manufactured contours and are referred to as "planar seating." These devices do not provide a stable or sufficiently contoured loaded interface to assist in achieving or maintaining a more desirable posture. Other more sophisticated versions of the planar cushion utilize multiple layers of different density polyurethane foam with or without additional pressure relieving media encased within a cover. An example of a complex planar cushion may use a gel, either water based, polyurethane or a silicone encased within a thin plastic envelope disposed on top of one or multiple densities of foam. These types of cushions generally provide better pressure reduction than the simpler planar foam cushions with no appreciable improvement in their ability to correct a poor sitting posture. These wheelchair cushions still fall in the general category of comfort cushions and are not prescribed for patients who have a history of pressure sores or who have several factors which place them at high risk for pressure sore development (i.e., poor skin integrity, incontinence, poor nutrition, etc.).

Other types of cushions exist which were primarily designed to deliver high pressure reduction without much regard to their ability to properly position the patient. The best example of this type of cushion is the Roho cushion. The Roho cushion uses a neoprene bladder comprised of interconnected vertical cells encased within a cover. The contained volume of air can flow from one cell to another and is effectively baffled by the use of small port openings. The total vertical loading on this cushion type is primarily deflected via the increased total surface area of affected or contacted cells plus the total internal surface area of the non-contacted cells. However, these cushions require the patient to have the necessary dexterity to adjust the contained volume of air via a supplied pump. Frequently, within six months these cushions require daily adjustment due to ever increasing rates of air loss. Their optimum operating air pressure range is relatively narrow and there is no available gauging system to measure the actual PSI. For optimum inflation each patient needs the use, each and every time, of a computerized pressure mapping equipment. This equipment is available in certain facilities however is basically used for initial wheelchair seating assessments. Another drawback of this system is that the entrapped air becomes uncomfortably hot and this leads to a loss of tissue integrity. When these types of cushions are over inflated or under inflated they become extremely unstable bases for pelvic posturing. Additionally, these cushions are prone to puncturing.

Another category of commonly seen wheelchair cushion employs a contoured foam base encased within a cover. The foam base may comprise the entire cushion or it may utilize additional pressure relieving media disposed on top of its contoured foam base. This contoured foam base may be a "deforming" foam, i.e., compresses under normal loading conditions, or a "non-deforming" foam, i.e., a rigid foam. One popular model of a contoured base cushion uses a liquid gel or fluid in two or three separate compartments disposed on top of a contoured rigid foam base. This type of cushion suffers from the fact that when loaded, the gel migrates to the perimeter of the each of the encapsulating envelopes. Once the gel has migrated away from the areas corresponding to the bony prominences (coccyx, sacrum or ischial tuberosities) the entire device becomes ineffective as its rigid foam base offers little protection (pressure reduction) or actually promotes pressure sore development. Additionally, the fluid or gel itself tends to separate into its components and must be regularly kneaded to maintain a proper operating viscosity. Efforts to lighten gel filled cushions by lightening the gel has resulted in gels which more rapidly separate. Fluid gel cushions also have the disadvantage of being subject to freezing in cold climates.

Another type of cushion in the contoured base category utilizes an inflatable air bladder disposed on top of a contoured pressure-relieving foam base. This type of cushion usually has interconnected vertical air cells of the type previously cited in the Roho cushion. In a contoured foam base application these interconnected air cells are generally of a reduced height. This reduction in the height of the air cells represents an improvement with regard to patient stability. These cushions become equally hot with sustained use and remain vulnerable to puncture and still require almost daily adjustment of the pressure of the contained volume of air.

Another type of contoured foam base cushion uses a molded pressure relieving foam base in conjunction with a solid elasticized urethane gel interface. The type of elasticized urethane gel most commonly employed is comprised of long chain molecules derived from isocyanates and polyols. These cushions provide very high pressure reduction and afford significantly enhanced postural alignment and stability. The solid gel contoured foam base cushion requires no maintenance by either the user or caregiver and offers a stable platform for superior pelvic positioning. The solid elastomeric gel remains uniform, with minimal migration, at loaded equilibrium. The solid urethane gel also represents an improvement in providing the lowest sustained interface temperatures. The main drawback to this type of cushion is that they are very heavy. Frequently, this type of cushion, although providing the required pressure relief and stability, is eliminated from consideration by the patient and therapist alike, because the patient or an elderly spouse can not easily manage the cushion's weight. In the course of frequent daily activities, the cushion must be removed from the wheelchair prior to the wheelchair being folded for transportation. Frequently, the wheelchair user must retrieve their cushion from a car seat prior to transferring back into the wheelchair. Many elderly wheelchair users must follow this routine as they do not meet the necessary funding criteria to obtain a power wheelchair. Additionally the design convention for these types of cushions is to use a relatively firm foam in the contoured base. These cushions are expensive, and a firmer foam is selected for its resistance to assume any permanently compressed shapes. Although this design strategy improves the cushions useable life, it diminishes the cushions ability to additionally conform beyond the manufactured contours to the individual user.

Another type of cushion is the compression bonded urethane matrix or honeycomb cushion. This type of cushion uses two strata of a flexible urethane matrix which form a network of regularly shaped cells. In some models one of the strata is contoured. The upper extremity of the upper strata is open and the cushion relieves pressure via the distortion of the open cell walls mostly at the patient interface. This type of cushion is very low in weight, but tends to be less comfortable. These cushions have little ability to additionally conform to the individual patient's anatomy beyond this region of upper cell wall distortion. Although flexible in all three dimensions, these cushions assume the general shape of the wheelchair sling upholstery because the upper strata cannot flex within the confines of the lower strata.

It would be desirable to provide a cushion structure which combines the best characteristics of pressure reduction, stable positioning, light weight and cool patient interface.

SUMMARY OF THE INVENTION

An anatomical support according to the present invention includes a patient interface layer of gel, a matrix panel and a foam base.

In a preferred form the gel is a solid gel bonded to the matrix panel in a reactive molding process to form a gel matrix composite panel. In one embodiment, the foam base includes multiple layers of foam of different densities. The base may include a contoured layer, which layer generates a contoured surface at the patient interface.

In another embodiment, the present invention is a wheelchair cushion having a contoured base which includes a pommel or abductor formed from foams of differing densities to be more resilient in the front to back horizontal direction than in the side-to-side direction.

BRIEF DESCRIPTION OF THE DRAWINGS

FIG. 12 is a representation of a widely used convention of measurement indicating the average locations of the human ischial tuberosities when properly positioned in a wheelchair cushion.

FIG. 13 is a cross sectional view of the cushion of FIG. 12.

DETAILED DESCRIPTION OF THE INVENTION

Figure 1:
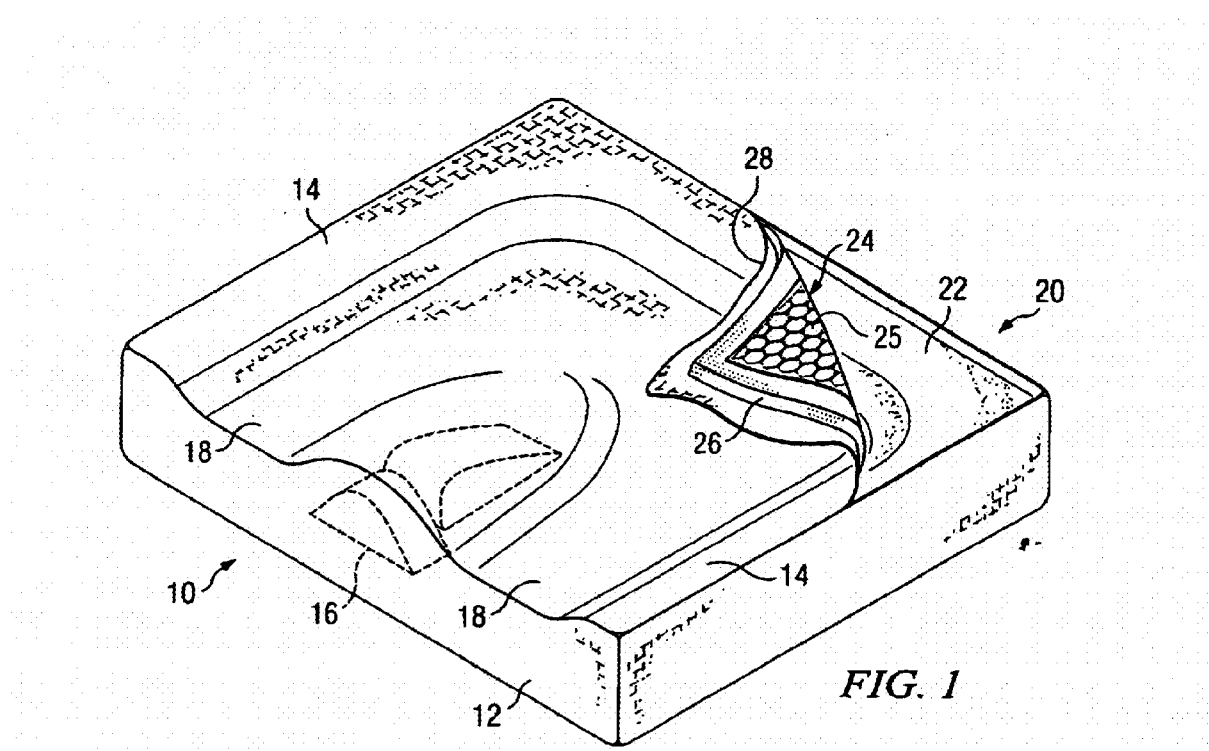
FIG. 1 is a perspective, partially broken away, view of a wheelchair cushion embodiment of the present invention.

With reference to FIG. 1 a wheelchair cushion embodiment 10 of the present invention is illustrated. This cushion 10 includes a foam base 12 with a contoured upper surface. The contours include raised areas 14 on the sides and back of the cushion which form a horseshoe shaped adductor. Another contour is a front center raised area 16 which forms an abductor. Areas 18 between the abductor 16 and the adductor 14 generally conform to the patient anatomy to reduce pressure and stabilize the patient's position. Several upper layers of the cushion 10 are shown in the pulled back corner at 20. The top of the foam base 12 is shown as surface 22. A composite panel 24 according to the present invention includes a matrix or honeycomb panel 25 and a solid gel layer 26. A fabric cushion cover 28 is also illustrated as being pulled back to expose the other layers. The cover 28 is preferably removable for cleaning.

Figure 2:
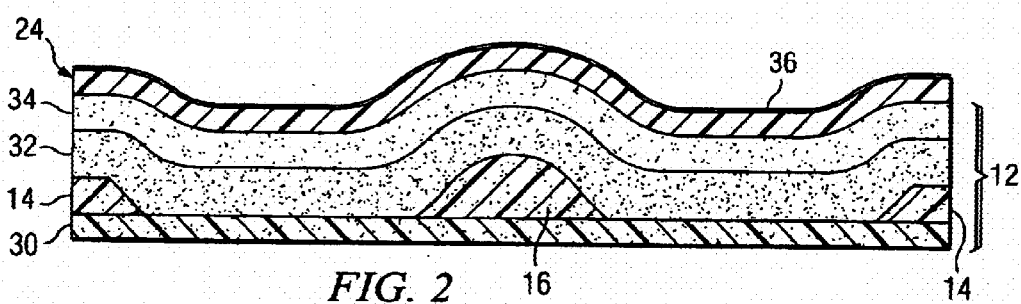
FIG. 2 is a cross sectional front view of the cushion of FIG. 1.

FIG. 2 is a front view of one embodiment of the cushion 10 in which the foam base 12 includes several layers. A first foam layer or base layer 30 is made of non-deforming rigid foam. The adductor 14 is supported on layer 30 and may also be formed of non-deforming rigid foam. The abductor 16 is made of viscoelastic foam. A second foam layer 32 is formed of soft SunMate viscoelastic foam. A third foam layer 34 is formed of extra soft, or X-Soft, SunMate viscoelastic foam. The composite panel 24 made of solid gel and a honeycomb panel rests on top of foam layer 34. A urethane-laminated fabric is bonded to the top surface 36 of the composite panel 24 with the coated side up. In a preferred embodiment, base layer 30 is ½ inch thick, soft foam layer 32 is one inch thick, extra soft layer 34 is ¾ inch thick and composite panel 24 is ½ inch thick. The adductor 14 is about ¾ inch thick. The matrix panel 25 (FIG. 1) is not visible in a front view since, in this embodiment, it does not extend to the edges of composite panel 24. Each of the layers is bonded to its adjacent layers by suitable adhesives.

The SunMate foams are manufactured by Dynamic Systems, Inc. of Leicester, N.C. The Soft Sunmate foam is specified to have an 8.5 inch ball indentation of from 0.69 to 0.74 inch, and a 2.0 inch ball indentation of from 0.30 to 0.34 inch at a pressure of 0.73 to 0.66 pounds per square inch. The extra soft, or X-Soft, Sunmate foam is specified to have a 8.5 inch ball indentation of from 0.82 to 0.87 inch, and a 2.0 inch ball indentation of from 0.36 to 0.40 inch at a pressure of 0.63 to 0.58 pounds per square inch.

Figure 3:
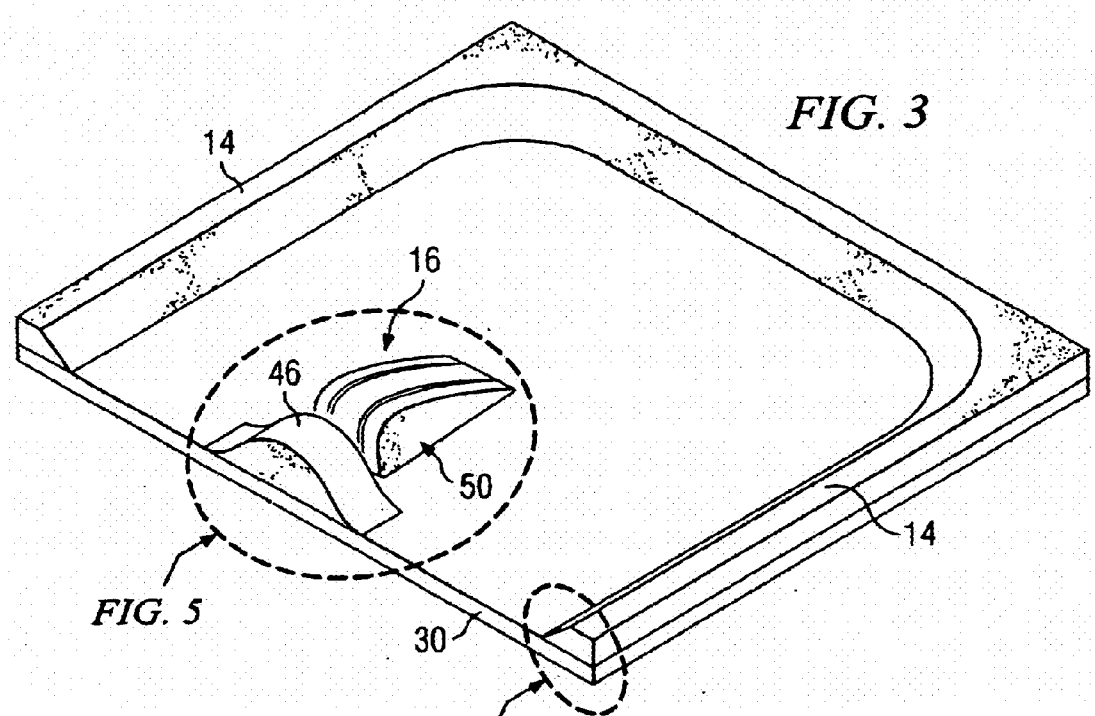
FIG. 3 is a perspective view of a nonconforming contoured foam base of the cushion of FIG. 1.
Figure 4:
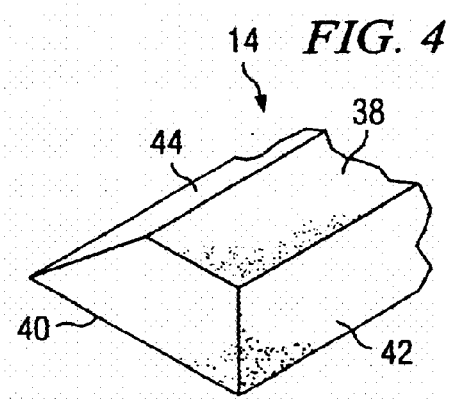
FIG. 4 is a perspective view of an adduction element of the base shown in FIG. 3.
Figure 5:
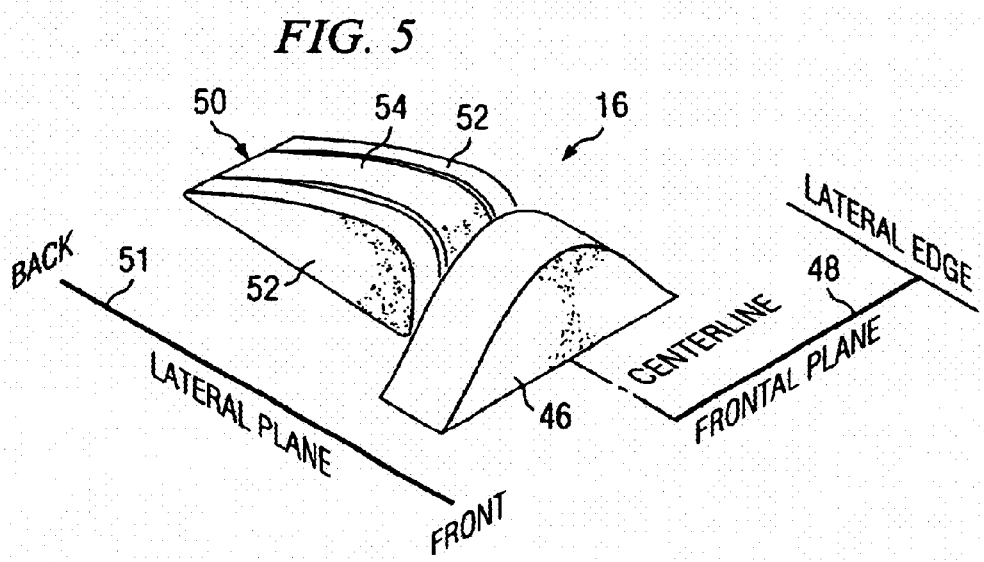
FIG. 5 is a perspective view of an abduction or pommel element of the base shown in FIG. 3.

With reference to FIGS. 3, 4 and 5, more details of the construction of the rigid foam base 30, adductor 14 and abductor 16 of one embodiment are shown. For purposes of this disclosure, the cushion 10 will be assumed to be in its normal position when used in a wheelchair. For example, the base 30 will be assumed to be horizontal and the pommel or abductor 16 will be considered to be in the front. The base 30 is a planar sheet of non-deforming rigid foam, in this embodiment ½ inch thick. The horseshoe shaped adductor 14 is formed of high density polyurethane foam with the cross section shown in greatest detail in FIG. 4. The upper surface 38 and lower surface 40 are horizontal and side 42 is vertical. Side 44 of adductor 14 is slanted or beveled at an angle of about 45 degrees, i.e. halfway between horizontal and vertical.

The abductor 16 is preferably made of two separate foam parts as illustrated in greatest detail in FIG. 5. A front part 46, positioned parallel to the frontal plane 48 is formed from soft SunMate viscoelastic foam. A second part 50 is formed of a laminate of two foam layers 52 separated by a third foam layer 54. The part 50 is positioned parallel to the front to back lateral plane 51. Layers 52 are formed of Confor 45 viscoelastic foam. Layer 54 is formed of Confor 42 viscoelastic foam. By forming the pommel 16 of two parts having different characteristics, the pommel is more resilient in the front-to-back horizontal axis 51, than in the side-to-side axis 48. The Confor foams are made by the E-A-R Specialty Composites company of Indianapolis, Ind. The Confor foams are also known as temperature sensitive foams.

Figure 6:
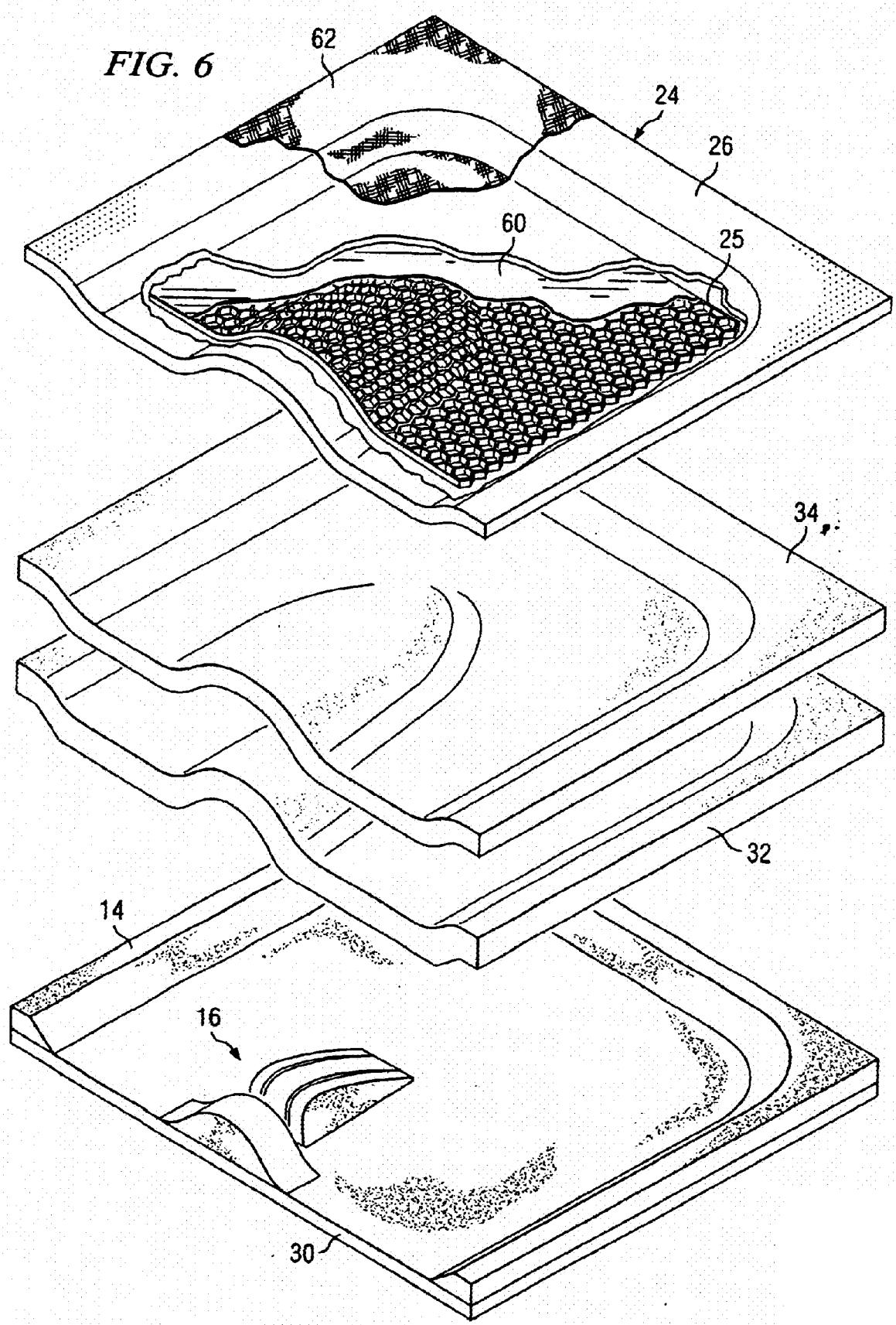
FIG. 6 is an exploded and partially broken away view of the cushion of FIG. 1.

FIG. 6 provides an exploded view of a wheel chair cushion embodiment of the present invention and more details of the composite panel 24. Parts corresponding to parts shown in FIGS. 1–5 have the same reference numbers. For example, the foam base 30, adductor 14, abductor 16, and foam layers 32 and 34 are the same as described above. The composite panel 24 is formed of a solid gel, or vulcanized polygel, layer 26 on top of a flexible urethane matrix or honeycomb 25. The cell walls of the matrix 25 are vertically oriented. The top of the matrix 25 is bonded to a urethane facing sheet 60 which stabilizes the shape of the matrix 25 during the manufacturing processes and prevents the solid gel 26 from flowing into the matrix during assembly. A layer of urethane coated polyester fabric 62 is bonded to the top surface of gel layer 26 with the coated surface up. In this exploded view, the matrix 25 lower surface is open and facing foam layer 34 to which it is bonded, i.e. glued, during assembly.

In the illustrated embodiment, the matrix panel 25 is smaller in its horizontal dimensions than the composite panel 24 and is about half as thick. In this embodiment, the matrix 25 has about 80% of the surface area of the complete panel 24 and therefore occupies about 40% of the total volume of panel 24. In this embodiment, the matrix 25 is essentially centered in panel 24 so that the edges of panel 24 are solid gel from the lower to upper surfaces. The areas of panel 24 which have solid gel at the lower surface are bonded to a urethane coated polyester fabric as will be illustrated in more detail below. Since the matrix 25 has very low density, the weight of panel 24 is substantially less than the weight of a conventional half-inch thick solid gel panel.

The relative volume occupied by the matrix 25 may be increased to achieve further weight reduction while still having the benefits of a gel patient interface. The matrix may occupy up to about ¾ of the thickness of the total composite panel 24. It may also extend to some or all of the edges of composite panel 24. If the matrix has a thickness of ¾ of the composite panel 24 and extends to all four sides of composite panel 24, the matrix 25 will replace about ¾ of the gel and reduce the weight by over ½. It is desirable that the gel 26 have a thickness of from about 1/16 inch to as much as ⅜ inch in the areas where it lies on top of the matrix 25.

Figure 7:
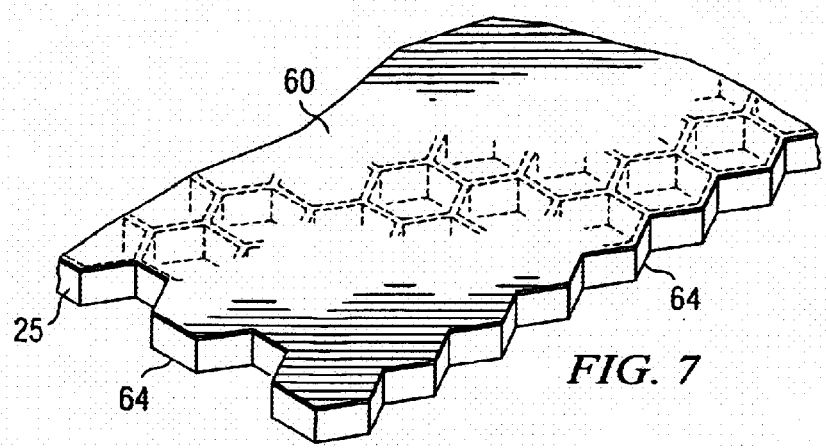
FIG. 7 is a perspective view of the matrix panel or honeycomb element of the cushion of FIG. 1.

FIG. 7 provides more details of the structure of the matrix or honeycomb panel 25 of FIG. 6. The matrix 25 is composed of a flexible urethane having regularly shaped cells 64, with a facing sheet 60 bonded to the upper surface of the matrix 25 and thereby sealing the upper extremity of every cell. The lower extremity of each cell 64 is open and may or may not have a deforming flange. The cells 64 may be of hexagonal shape corresponding to the common terminology of a honeycomb panel or core or may be of other shapes. The matrix 25 may be formed by thermal compression bonding of sheets of polyurethane together and then expanding the bonded sheets to open the cells. The facing sheet or deforming flange is often used to maintain the matrix in its expanded shape. Alternatively, the matrix panel 25 may be extruded.

In the embodiment shown in FIG. 7, the matrix has a height of ¼ inch or 6 mm, but may have a height of from about 3/16 inch or 4 mm to one inch or 25 mm. The height is less than the thickness of composite panel 24 so that the panel 24 includes a gel patient interface layer of at least about 1/16 inch over its complete upper surface. The thickness of the urethane film matrix web or walls in this embodiment is about 0.015 inch, but may be from about 0.008 inch to about 0.032 inch. The preferred cell diameter is about 0.43 inch, but may be from about 0.25 inch to about 0.75 inch. The top facing sheet is a urethane film having a thickness of about 0.005 inch in this embodiment, but may have a thickness from about 0.003 inch to about 0.030 inch.

Figure 8:
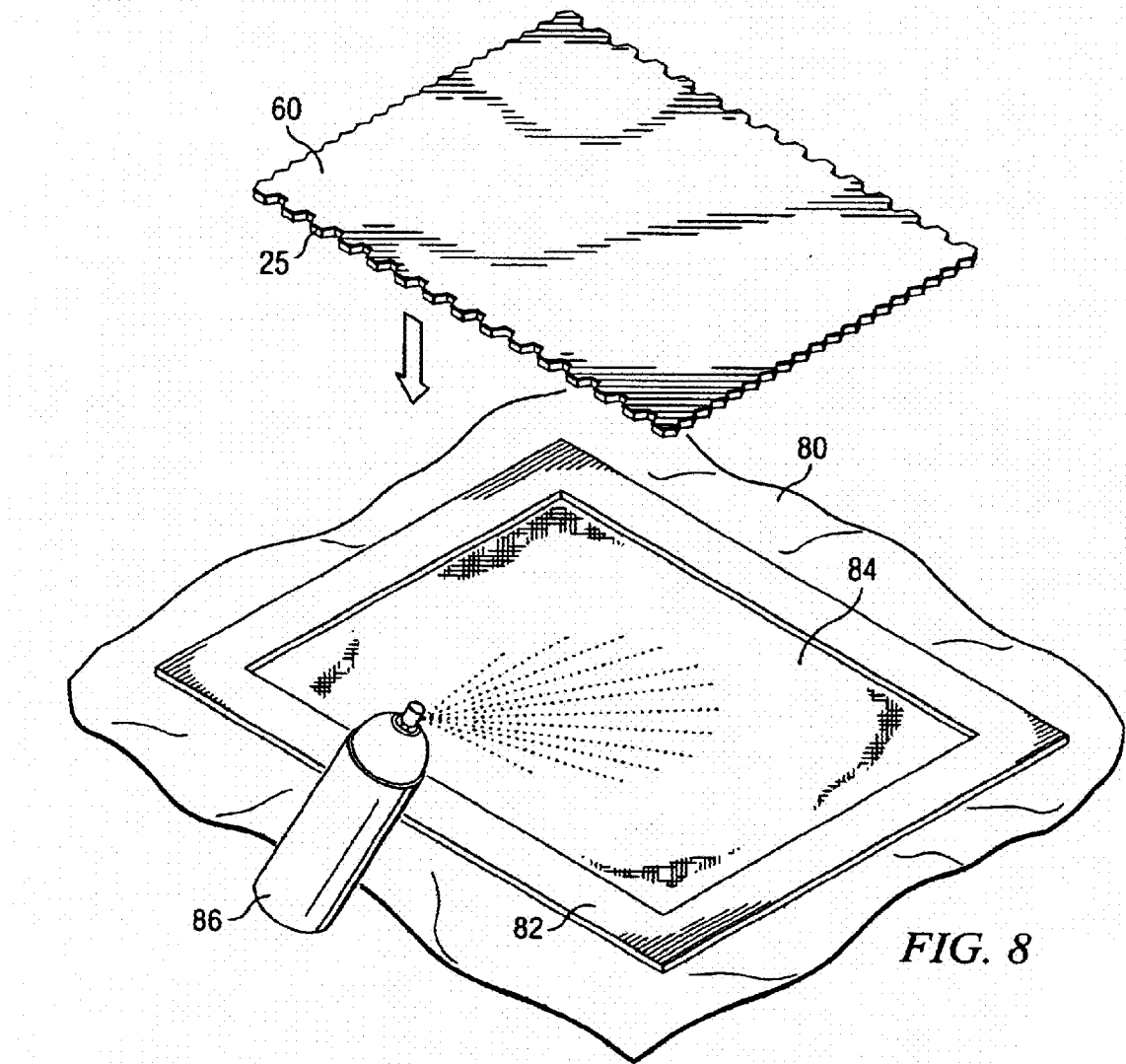
FIG. 8 is an illustration of a step used in making the cushion of FIG. 1.

FIG. 8 illustrates one step in making a cushion 10 and, in particular, in making the composite panel 24. In FIG. 8 the honeycomb panel 25 is to be bonded to a urethane laminated polyester fabric 80. A template 82 placed over a piece of the fabric 80 which is oriented laminated side up. This template has a central polygon cut-away which approximates the length and width of the urethane matrix panel 25. The exposed area 84 is sprayed with an adhesive, for example by use of a spray can 86. The matrix panel 25 is affixed to the adhesive covered fabric 80 open cell side down. The laminated side of the fabric 80 forms a continuous seal with the previously open lower extremities of the cells of panel 25. The resulting structure is a centrally located urethane matrix panel 25 affixed to the laminated side of a coated fabric 80 with the original bonded urethane facing sheet 60 oriented up and above the fabric surface. This results in a structure in which all the matrix cells 64 are sealed with respect to a viscous liquid. Note that if the it is desired to have the matrix 25 extend to all sides of the finished composite panel 24, it would not be necessary to use the template and the entire surface of fabric 80 could be sprayed with adhesive.

Figure 9:
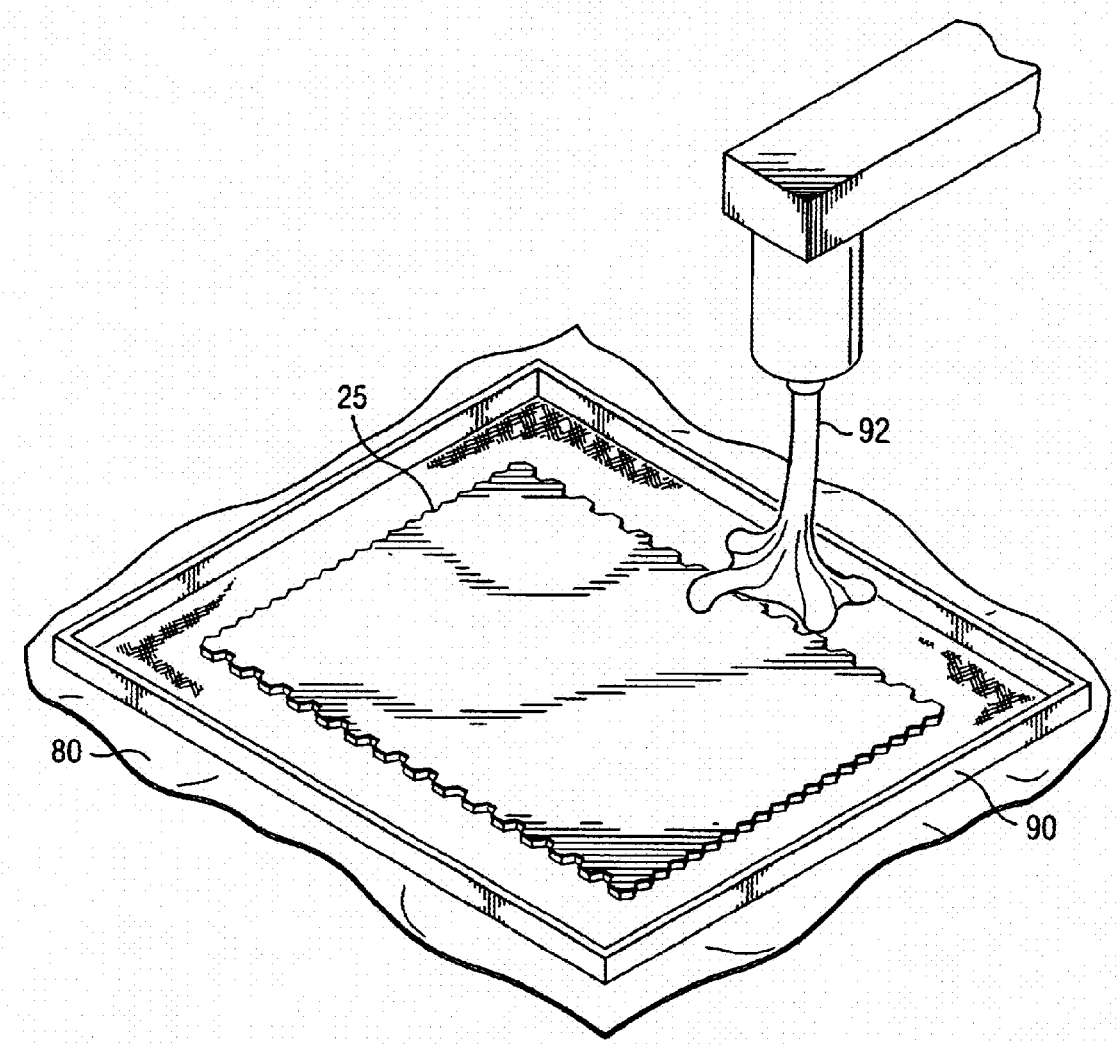
FIG. 9 is an illustration of another step used in making the cushion of FIG. 1.

FIG. 9 illustrates the process step in which the composite panel 24 is formed. A fabric section 80 with a matrix 25 bonded to its coated surface is positioned in an open cast mold 90. It is preferred to use a temporary adhesive or transfer tape under the fabric section 80, at least in the area of matrix 25, to hold the fabric 80 in position in the mold 90 and prevent floating when liquid components are placed in the mold. A measured volume of an isocyanate-polyol urethane gel 92 is dispensed (LIM method-liquid injection molding) into the open cavity. For the embodiment described herein, the mold is filled to a depth of ½ inch. The polygel is produced in a two component reaction injection process in which isocyanate, polyol and a catalyst are mixed as they are injected or poured into the mold 90. The ratio of these components is carefully controlled as this ratio determines the durometer or firmness of the cured polygel. In the preferred embodiment, the cured solid gel has a durometer value in the range of 3 to 19, and preferably in the range of 6 to 15 on the Shore 00 scale. Since the matrix 25 is sealed on both top and bottom, the liquid does not flow into the matrix. As the gel 92 cures, it bonds to the facing sheet sealing the top of the matrix 25 and to the coated surface of fabric panel 80. After the gel has cured, the panel is removed from the mold and the fabric which is affixed to the previously open lower cell side of the matrix 25 is cut away. This re-exposes the open lower extremities of all the cells forming matrix 25.

Note that, in the case where the matrix 25 extends to all four sides of the final composite panel 24, it may be possible to eliminate the fabric panel 80 and the need to remove it after curing of the gel 26. The transfer tape used to hold the matrix 25 in the mold may provide sufficient sealing of lower cell extremities to prevent liquid gel components from entering the cells.

Figure 10:
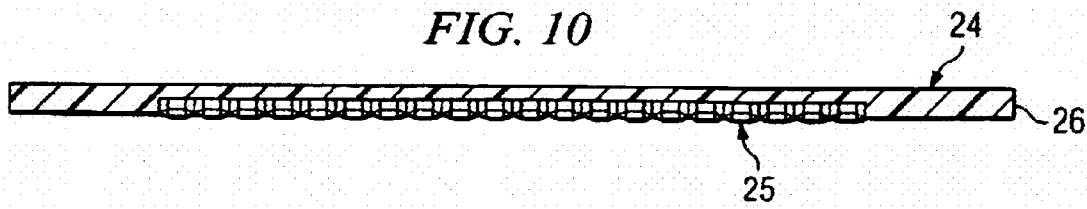
FIG. 10 is a cross sectional illustration of a solid gel matrix composite panel resulting from the process steps shown in FIGS. 8 and 9.
Figure 11:
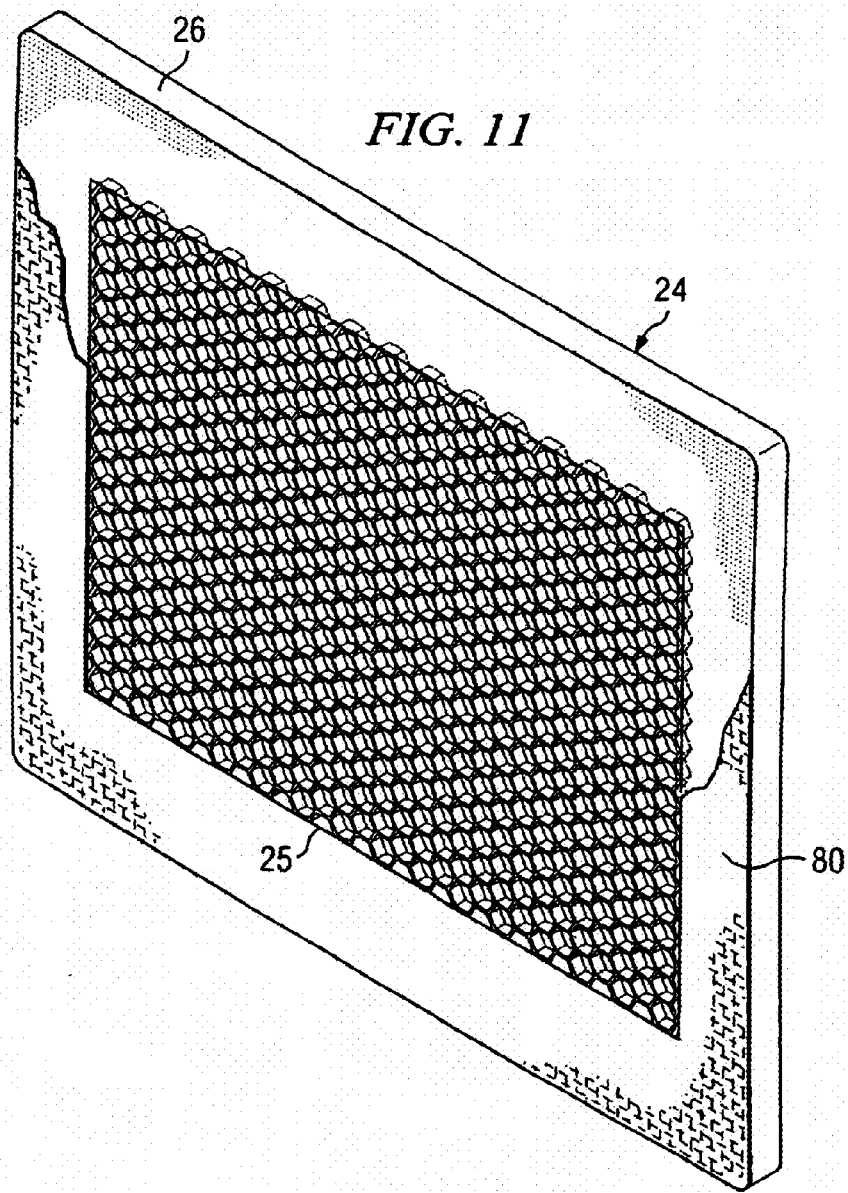
FIG. 11 is a perspective, partially broken away bottom view of the solid gel matrix composite panel resulting from the process steps shown in FIGS. 8 and 9.

FIGS. 10 and 11 provide cross sectional and bottom perspective views of the panel 24 after the assembly steps illustrated in FIGS. 8 and 9. The solid gel 26 is bonded to the top and sides of matrix panel 25 in a conversion process. The matrix 25 and solid gel 26 are rendered inseparable, except with the use of extraordinary means, at the completion of this process. The matrix 25 is about ¼ inch thick, and the overall composite panel 24 is about ½ inch thick. The cells of matrix 25 are open on the bottom surface of composite panel 24. The remaining fabric 80 covers the lower surfaces of the solid gel 26, forming a "frame" around the matrix panel 25. The composite panel 24 remains flexible at the completion of the conversion process and is flexible in all three axes. When the composite panel 24 is affixed to the foam layer 34, as shown in FIG. 6, it assumes the contours of the foam layer 34, (see also FIG. 13).

FIG. 12 is a representation of a widely used convention of measurement indicating the average locations of the human ischial tuberosities when properly positioned in a wheelchair cushion as applied to the cushion 10 of FIG. 1. Points of maximum pressure lie generally along the line 88.

FIG. 13 is a cross sectional view of the cushion 10 along the line 88 of FIG. 12. Parts corresponding to parts in earlier figures, e.g. FIG. 6, have the same reference numbers. As indicated above, each of the layers 30, 14, 32, 34 and 26 are bonded together with appropriate adhesives. When composite panel 24 is bonded to foam layer 34, the adhesive is applied to the entire upper surface of foam layer 34. As a result, the fabric 80 and all of the lower edges of the open cells 64 of matrix 25 are bonded to the foam layer 34. The composite panel 24 has conformed to the contoured shaped of the supporting foam layers 34, etc. The illustrated contouring is representative of the cushion in the unloaded state, that is, with no external forces applied.

Figure 14:
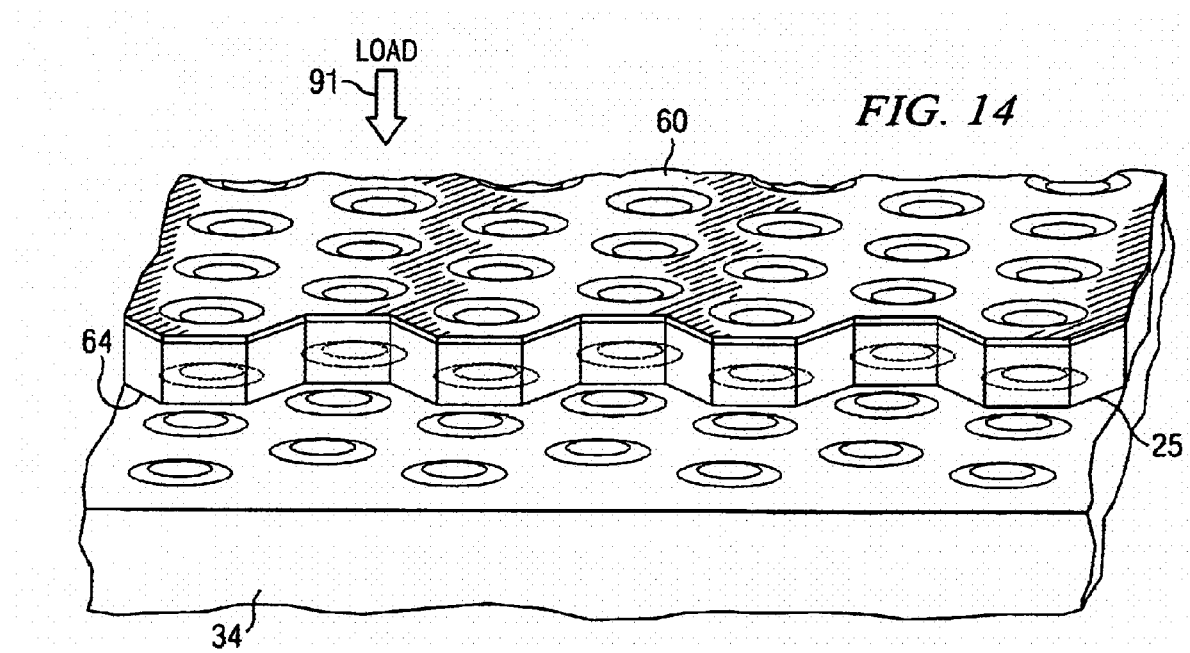
FIG. 14 is a perspective view of the surface response to pressure of the foam base at its interface with the matrix panel.

FIG. 14 illustrates several functional advantages of the structure shown in FIG. 13. It illustrates the surface response of the upper layer of X-soft SunMate foam 34 to the open lower extremities of the matrix 25 when a vertical load 91 is imparted on the matrix panel. The surface of this foam layer distorts up into individual hemispherical shapes to partially fill the volume of each cell. In this manner the foam reinforces or buttresses the geometric relationships of adjacent cell walls and impedes a distortion response beginning at the open lower extremity of each cell. In similar fashion, the urethane facing sheet 60 bonded to the top surface of matrix 25 is flexible enough to allow some deformation of the solid gel 26 down into the upper ends of the cells 64.

Figure 15:
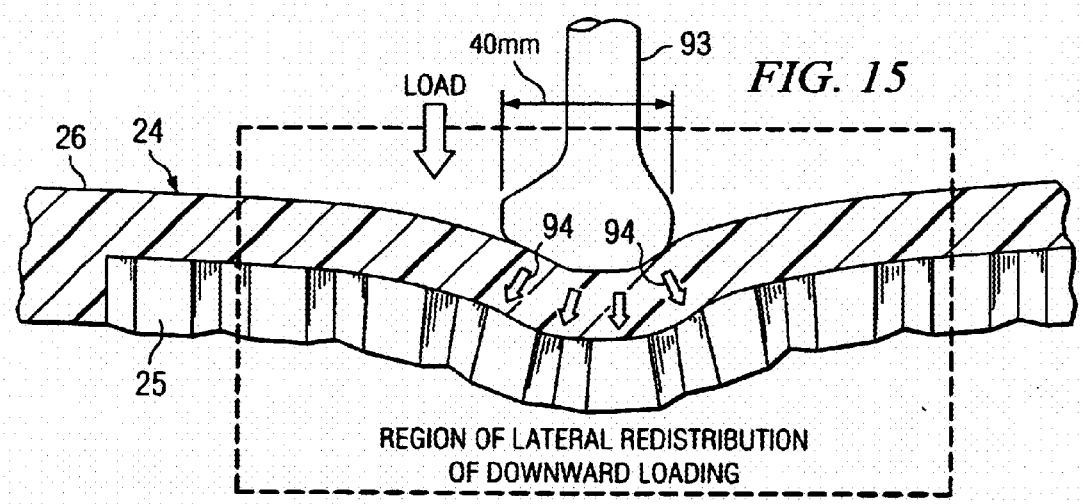
FIG. 15 illustrates the deflection response of the polygel flexible matrix composite panel of FIG. 10 to a vertical loading using an indentor approximating the size and shape of a human ischial tuberosity.

FIG. 15 illustrates the deflection response of the composite panel 24 to a vertical loading using an indentor 93 approximating the size and shape of a human ischial tuberosity. Note the indentor 93 is intentionally asymmetrical. The Sunmate soft foam layer 32 and the SunMate X-soft foam layer 34, (see FIG. 13) which support composite panel 24 conform while the cell walls of the matrix panel 25 have changed their orientation as the composite panel 24 has deflected the vertical load, as indicated by arrows 94, by flexing in all three dimensions. Note the large expanse of the affected response area involved in this deflection of a relatively localized load. This is primarily a result of the three-dimensional flexing and the inherent resiliency of the composite panel 24 which laterally extends the area of deflection in a radial pattern from the point of vertical loading. In essence, the panel floats in a three dimensional pattern atop the multiple strata of conforming foams 32, 34. Additional pressure relief or force deflection in the immediate area of loading is accomplished by the polygel layer 26 itself, however the polygel component 26 of the composite panel 24 remains relatively uniform in thickness as compared to prior art liquid gel cushions.

Figure 16:
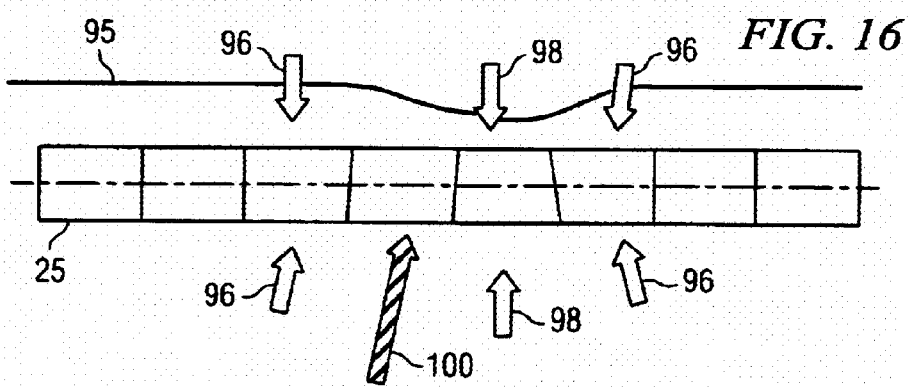
FIG. 16 is a linear representation of the cell wall orientation imparted by the vertical loading of the indentor in FIG. 15.

FIG. 16 is a linear representation of the cell wall orientation of matrix 25 imparted by the vertical loading of the indentor 93 in FIG. 15. The line 95 has the same shape as the top of matrix 25 in FIG. 15. Forces indicated by arrows 96 tend to cause the cell diameter at its upper extremity to increase while cell diameter at the lower extremity tends to decrease. Forces indicated by arrows 98 tend to cause cell diameter at it upper extremity to decrease while cell diameter at the lower extremity tends to increase. At intermediate locations such as 100, the upper and lower cell diameters tend to remain the same, but the entire cell orientation shifts or slants in response to the applied forces. These changes in cell wall orientation represent the absorption or deflection of the downward force.

Due to the reinforcing nature of the bonded urethane upper facing sheet 60 (see FIG. 6) the cell diameters are more apt to elongate or compress at their open lower extremities. The lower extremities of the cells are bonded to the foam layer 34 (see FIG. 13) and as illustrated in FIG. 14, the foam layer 34 tends to deflect into the cells in response to the applied forces. This interaction of the matrix or honeycomb 25 at its interface with foam layer 34 has several benefits. The foam 34 provides a reinforcing effect preventing collapse of matrix cells on their lower extremities somewhat like the upper facing sheet 60 but with more flexibility. The ability of the foam 34 to extend into the cells adds to cushioning effect. The matrix 25 spreads the forces over the foam 34. These multiple interactions allow use of a softer foam layer 34, in this case it is extra soft SunMate foam. As noted in the background section above, normal convention requires use of a more firm foam when a solid gel patient interface or top layer is used to avoid bottoming out of the foam layer.

The combination of solid gel 26, matrix 25 and supporting foam layers also creates a good dampening response to shock loads or changes in loading. The change in loaded contour is relatively slow and therefore provides more stable support in a dynamic situation, such as when a wheelchair is moving on an uneven surface or making a quick turn.

Figure 17:
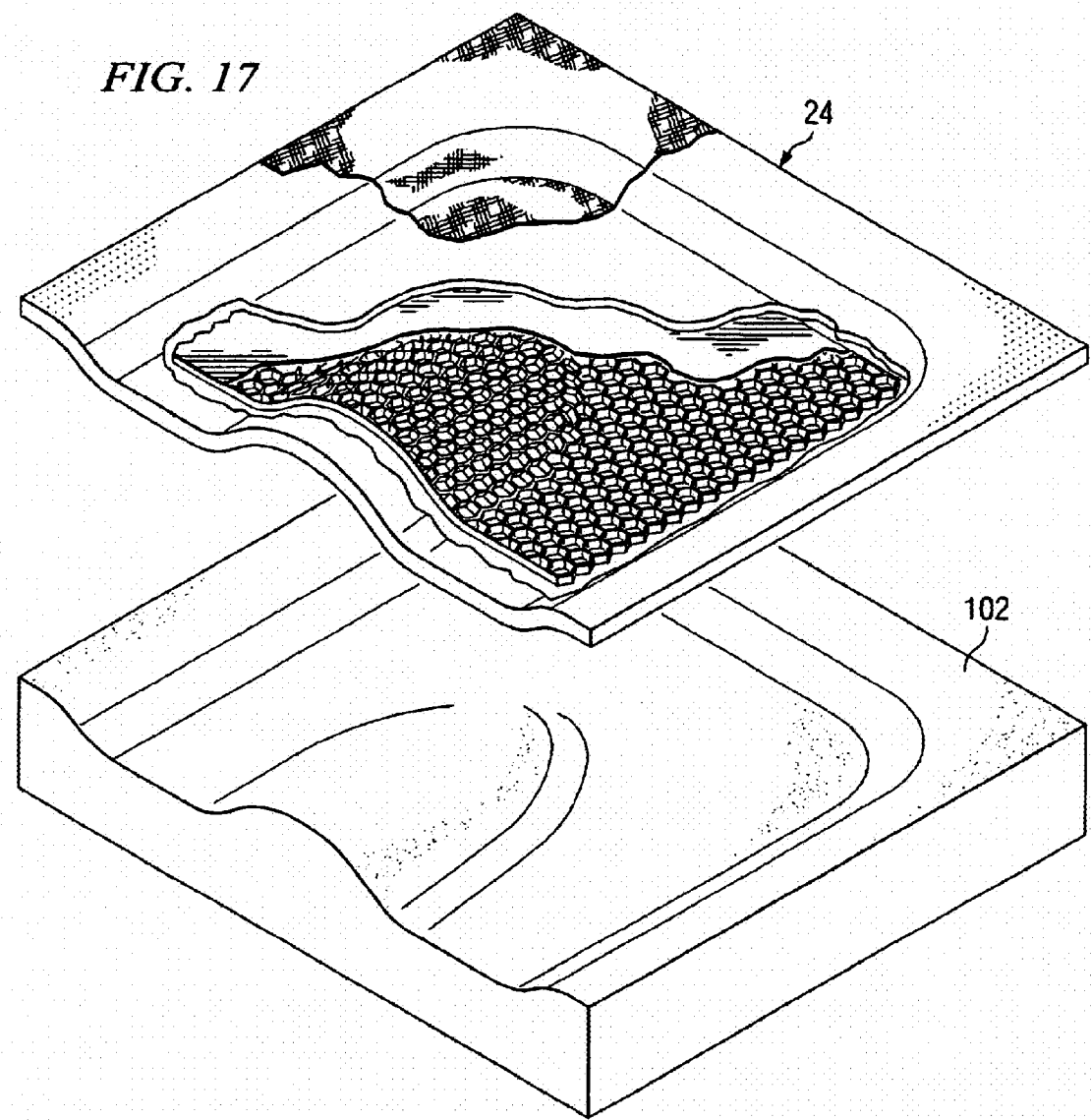
FIG. 17 is a perspective exploded view of an alternate wheelchair cushion embodiment having a contoured one-piece molded foam base.

FIG. 17 illustrates an alternate embodiment of the present invention. In this embodiment, a polygel matrix composite panel 24 is bonded to a one-piece molded foam base 102. The base 102 may have the same external dimensions and shape as the base which results from assembly of the foam components 14, 16, 30, 32, and 34 shown in FIG. 6. The base 102 may be cast as a single component using an open or closed cell urethane foam, either deforming or non-deforming or its compression performance falling within these parameters. Likewise, a suitable foam may also be what is commonly termed "temperature sensitive" viscoelastic foam.

Figure 18:
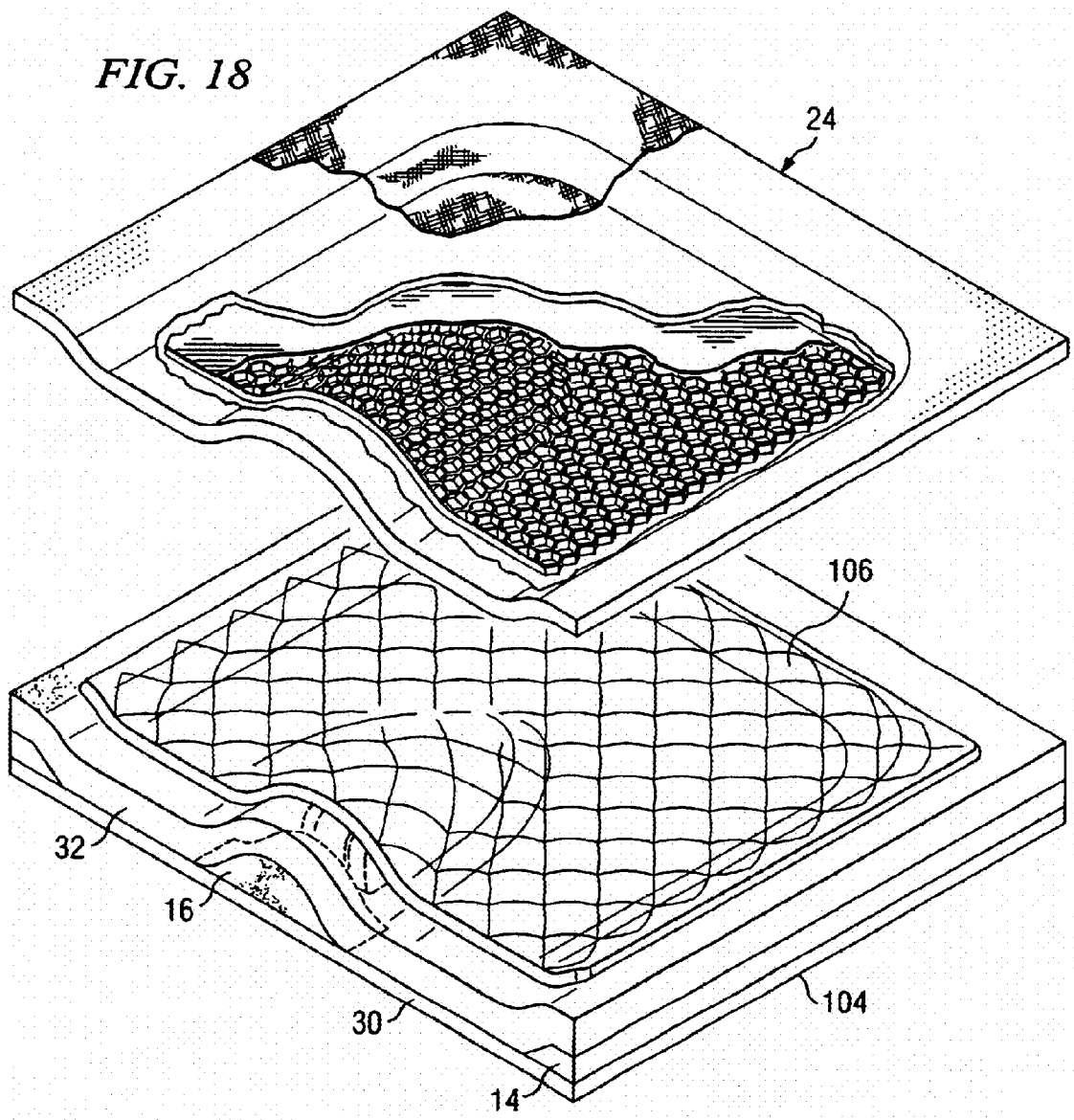
FIG. 18 is a perspective exploded view of an alternate wheelchair cushion embodiment having an intermediate air bladder.

FIG. 18 illustrates another alternate embodiment of the present invention. In this embodiment, a polygel matrix composite panel 24 is bonded to a base 104 including an air bladder 106. The base 104 may include elements 30, 14, 16, and 32 of FIG. 6 and additional foam layers if desired. The base 104 may be a one piece molded base such as base 102 of FIG. 17. The bladder 106 may contain several or numerous individual air pressurized compartments, or the compartments may be interconnected and baffled via the use of small port openings or a directional valve system. Likewise, this bladder, with or without the same compartmentalization and with or without a substrate flow regulation system, may contain a viscous liquid or any other non-compressible dry suspension flow substrate. The bladder is bonded to the supporting base and the composite panel 24 is bonded to the top of the bladder 106. The bonding of the matrix 25 to the top of the air bladder has a reinforcing and force spreading effect like the foam layer 34 in the FIG. 6 embodiment.

While the present invention has been illustrated and described in terms of particular apparatus and methods of use, it is apparent that equivalent parts may be substituted of those shown and other changes can be made within the scope of the present invention as defined by the appended claims.

What I claim as my invention is:

1. A cushion comprising:
    a composite panel having a layer of solid gel bonded to an upper surface of a matrix panel comprised of a plurality of regularly shaped cells having generally vertically oriented walls, having a facing sheet bonded to its upper surface.

2. The apparatus of claim 1 further including:
    a foam base bonded to a lower surface of said matrix panel.

3. The apparatus of claim 2 wherein:
    said foam base comprises multiple foam layers.

4. The apparatus of claim 3 wherein:
    said foam base comprises,
        a first layer of rigid foam,
        a second layer of soft foam supported by and bonded to said first layer, and
        a third layer of extra soft foam supported by and bonded to said second layer,
    said third layer bonded to said matrix panel.

5. The apparatus of claim 4 further including;

contouring elements positioned between said first layer and said second layer.

6. The apparatus of claim 5 wherein:

said contouring elements comprise an adductor positioned along the back and sides of said cushion.

7. The apparatus of claim 5 wherein:

said contouring elements comprise an abductor positioned at the center of the front of said cushion.

8. The apparatus of claim 7 wherein:

said abductor comprises a first foam element aligned with the front edge of said cushion and a second foam element aligned with the sides of said cushion.

9. The apparatus of claim 8 wherein:

said first foam element has lower density than said second foam element, whereby said abductor provides more resistance to back to front forces than to side to side forces.

10. The apparatus of claim 1 wherein:

said solid gel layer has length and width dimensions greater than the length and width dimensions of said matrix panel, said matrix panel is generally centered under the solid gel layer, said solid gel layer is thicker in areas in which it extends beyond said matrix panel, extends to the lower edge of said matrix panel and is bonded to the sides of said matrix panel.

11. The apparatus of claim 1 further including:

a fabric panel bonded to the top surface of said layer of solid gel.

12. The apparatus of claim 11 wherein:

said fabric layer comprises polyester fibers, further including a urethane coating on a top surface of said fabric layer.

13. The apparatus of claim 1 wherein:

said solid gel comprises a urethane gel produced by reacting isocyanate and polyol in the presence of a catalyst.

14. The apparatus of claim 1 wherein:

said cells have a generally hexagonal cross sectional shape.

15. An anatomical support comprising:

a layer of solid gel, a honeycomb layer comprised of a plurality of cells defined by generally vertically oriented walls covered by a facing sheet, supporting and bonded to said gel, a flexible support supporting and bonded to said honeycomb layer.

16. An anatomical support according to claim 15 wherein:

said flexible support is a layer of foam.

17. An anatomical support according to claim 15 wherein:

said flexible support is a fluid filled bladder.

* * * * *